United States Patent
Okizaki et al.

(10) Patent No.: US 9,159,120 B2
(45) Date of Patent: Oct. 13, 2015

(54) IMAGE PROCESSING APPARATUS, IMAGE PROCESSING METHOD, AND STORAGE MEDIUM

(71) Applicant: National University Corporation ASAHIKAWA MEDICAL UNIVERSITY, Asahikawa-shi, Hokkaido (JP)

(72) Inventors: Atsutaka Okizaki, Asahikawa (JP); Tamio Aburano, Asahikawa (JP)

(73) Assignee: NATIONAL UNIVERSITY CORPORATION ASAHIKAWA MEDICAL UNIVERSITY, Hokkaido (JP)

( * ) Notice: Subject to any disclaimer, the term of this patent is extended or adjusted under 35 U.S.C. 154(b) by 0 days.

(21) Appl. No.: 14/397,951

(22) PCT Filed: Apr. 5, 2013

(86) PCT No.: PCT/JP2013/060451
§ 371 (c)(1),
(2) Date: Oct. 30, 2014

(87) PCT Pub. No.: WO2013/164938
PCT Pub. Date: Nov. 7, 2013

(65) Prior Publication Data
US 2015/0093046 A1    Apr. 2, 2015

(30) Foreign Application Priority Data
May 1, 2012  (JP) ................................. 2012-104394

(51) Int. Cl.
G06K 9/32       (2006.01)
G06T 3/40       (2006.01)

(52) U.S. Cl.
CPC ............. *G06T 3/4053* (2013.01); *G06T 3/4069* (2013.01)

(58) Field of Classification Search
CPC ... G06T 3/4053; G06T 3/4069; G06T 3/4015; G06T 3/4023; G06T 3/40; H04N 11/042; H04N 19/587; H04N 19/593; H04N 19/98

USPC ......................................................... 382/299
See application file for complete search history.

(56) References Cited

U.S. PATENT DOCUMENTS 6,674,903 B1 * 1/2004 Cliquet ......................... 382/199
6,714,693 B1   3/2004 Miyake
(Continued)

FOREIGN PATENT DOCUMENTS

| JP | 10-164358 | 6/1998 |
| JP | 2000-339449 | 12/2000 |
| JP | 2008-272202 | 11/2008 |

OTHER PUBLICATIONS

International Search Report dated Jun. 4, 2013, which issued during prosecution of International Application No. PCT/JP2013/060451, which corresponds to the present application.
(Continued)

*Primary Examiner* — Ali Bayat
(74) *Attorney, Agent, or Firm* — Troutman Sanders LLP

(57) ABSTRACT

An image processing unit of an image processing apparatus includes: a pixel value acquiring part that acquires pixel values of new pixels obtained by increasing resolution of a first image, using pixel values of multiple original pixels, of the first image, around a position at which each of the new pixels is disposed; a representative value acquiring part that acquires a representative value of the pixel values of the multiple new pixels arranged in an area in which each of the original pixels is disposed; a correction value acquiring part that acquires a correction value using the pixel value of each of the original pixels and the representative value; and a pixel value correcting part that corrects the pixel value of each of the original pixels using the correction value. The image processing unit performs correction processing for correcting the original pixels is repeated once or at least twice.

13 Claims, 10 Drawing Sheets

(56) References Cited

U.S. PATENT DOCUMENTS

| | | |
|---|---|---|
| 2009/0322891 A1* | 12/2009 | Kondo et al. .............. 348/218.1 |
| 2010/0061638 A1* | 3/2010 | Tanaka .......................... 382/199 |
| 2012/0057049 A1* | 3/2012 | Imagawa et al. ............. 348/234 |

OTHER PUBLICATIONS

Kaneyasu et al., Comparison of the enlarged image using an image interpolation method, 2006 Graduation Research, Okayama University of Science (machine translation is attached).

* cited by examiner

| Section ID | n |
|---|---|
| Head | 3 |
| Lung | 4 |
| Stomach | 2 |
| Liver | 2 |
| Bladder | 3 |
| ⋮ | ⋮ |

FIG.4

| Section ID | Distance |
|---|---|
| Head | 3 |
| Lung | 2 |
| Stomach | 2 |
| Liver | 3 |
| Bladder | 3 |
| ⋮ | ⋮ |

FIG.8

IMAGE PROCESSING APPARATUS, IMAGE PROCESSING METHOD, AND STORAGE MEDIUM

CROSS REFERENCE TO RELATED APPLICATIONS

This application is a U.S. National Phase application under 35 U.S.C. §371 of International Patent Application No. PCT/JP2013/060451 filed Apr. 5, 2013 which claims priority to Japanese Patent Application No. 2012-104394 filed May 1, 2012. The International application was published on Nov. 7, 2013, as International Publication No. WO 2013/164938 under PCT Article 21(2). The entire contents of these applications are hereby incorporated by reference.

TECHNICAL FIELD

The present invention relates to an image processing apparatus and the like for increasing the number of pixels of a bitmap image.

BACKGROUND

Examples of known conventional interpolation methods for increasing the number of pixels by interpolating pixels of bitmap images include the nearest neighbor method, the bilinear method (linear interpolation method), the bicubic method (cubic convolution interpolation method), and the like (see Non-Patent Document 1, for example).

CITATION LIST

Non-Patent Document

[Non-Patent Document 1] Toshiharu Kaneyasu, and one other, "Graduation Research for Academic Year 2006, Comparison of Enlarged Images Using Image Interpolation Methods", [online], Sawami Labo., Department of Information Science, Faculty of Informatics, Okayama University of Science, [accessed on Apr. 17, 2000], the Internet <URL: http://cafe.mis.ous.ac.jp/2006/sawasemi/sakae/%E7%94%BB%E5%83%8F%E8%A3%9C%E9%96%93%E6%B3%95.pdf>

However, conventional image processing apparatuses are problematic in that an image having a quality higher than that of an original image cannot be obtained.

For example, in the case of increasing the number of pixels of a bitmap image using conventional methods, jaggies and the like caused by enlarging the image can be prevented, but the obtained contrast and the like cannot reach those of the original bitmap image, and, as a result, only images that seem blurred are obtained.

In particular, in medical images of CT, MRI, PET, SPECT, or the like, obtaining detailed images, that is, high resolution images contributes to early detection of a lesion, which leads to improvement in medical techniques and contribution to patients. However, there is a limitation on the resolution of images acquired by a medical image acquiring apparatus, due to technical restriction of the medical image acquiring apparatus, physical properties of positrons as in the case of PET, or the like. Furthermore, since images are generated with a limited resolution, the influence of partial volume effect cannot be avoided. Accordingly, in the field of medical images, there is a demand for a technique for achieving a high resolution of medical images while reducing the partial volume effect. Note that the partial volume effect refers to a phenomenon that, in the case where multiple tissues are included in a section of a living body corresponding to one pixel of a medical image, an average of values obtained by scanning the multiple tissues is taken as a scanned value of the one pixel.

SUMMARY

The present invention is directed to an image processing apparatus, including: an image storage unit in which a first image is stored; an image processing unit that acquires a second image, which is an image obtained by increasing a resolution of the first image; and an output unit that outputs the second image acquired by the image processing unit; wherein the image processing unit includes: a pixel value acquiring part that acquires pixel values of multiple new pixels, which are pixels forming an image acquired by increasing the resolution of the first image, using pixel values of multiple original pixels around a position at which each of the new pixels is disposed, from among original pixels forming the first image; a representative value acquiring part that acquires a representative value of the pixel values of the multiple new pixels arranged in an area in which each of the original pixels of the first image is disposed, the pixel values being acquired by the pixel value acquiring part; a correction value acquiring part that acquires a correction value using the pixel value of each of the original pixels of the first image and the representative value acquired by the representative value acquiring part for an area in which that original pixel is disposed; a pixel value correcting part that corrects the pixel value of each of the original pixels of the first image, using the correction value acquired by the correction value acquiring part; and an image acquiring part that acquires a second image, which is an image configured by multiple new pixels having the pixel values acquired by the pixel value acquiring part; correction processing, which is processing in which the pixel value acquiring part acquires the pixel values of the multiple new pixels, the representative value acquiring part acquires the representative value of the pixel values of the multiple new pixels, the correction value acquiring part acquires the correction value, and the pixel value correcting part corrects the pixel value of each of the original pixels of the first image, is repeated, and the image acquiring part acquires a second image configured by multiple new pixels having the pixel values acquired by the pixel value acquiring part, using the pixel values of the multiple original pixels corrected by repeating the correction processing.

With this configuration, a correction value acquired using the pixel value of one original pixel and the representative value of the pixel values of multiple new pixels arranged in the area of this original pixel in the case of increasing the resolution thereof can be used to correct the original pixel. Thus, the resolution of the first image configured by the corrected original pixels can be made higher, and an image having a higher resolution and a higher quality than those of the original image can be obtained.

Furthermore, the image processing apparatus of the present invention is such that the image processing unit further includes a condition judging part that judges whether or not a predesignated end condition is satisfied each time the correction processing is performed once, and the image processing unit ends the correction processing in a case where the condition judging part judges that the end condition is satisfied.

With this configuration, the correction processing can be ended when a correction value that enables a second image having a high quality to be obtained is acquired.

Furthermore, the image processing apparatus of the present invention is such that the condition judging part compares the pixel value of each original pixel of the first image before the correction processing and the representative value of the pixel values of the multiple new pixels, of the second image, arranged in an area in which that original pixel is disposed, and judges that the end condition is satisfied in a case where a predesignated condition is satisfied by a result of the comparison.

With this configuration, the correction processing can be ended if a condition is satisfied by a result of the comparison between the pixel value of one original pixel and the representative value of the pixel values of multiple new pixels arranged in the area of this original pixel in the case of increasing the resolution thereof, and, thus, the correction processing can be ended when a correction value that enables a second image having a high quality to be obtained is acquired.

Furthermore, the image processing apparatus of the present invention is such that, each time the image processing unit performs the correction processing once, the condition judging part compares the pixel value obtained by the pixel value correcting part correcting the pixel value of each original pixel of the first image and the pixel value of that original pixel before performing the correction processing once, and judges that the end condition is satisfied in a case where a predesignated condition is satisfied by a result of the comparison.

With this configuration, the correction processing can be ended if a predesignated condition is satisfied by a result of the comparison between the original pixel corrected by one time of correction processing and the original pixel corrected by the correction processing immediately therebefore, and, thus, the correction processing can be ended when a correction value that enables a second image having a high quality to be obtained is acquired.

Furthermore, the image processing apparatus of the present invention is such that the condition judging part judges that the end condition is satisfied in a case where the number of repetitions of the correction processing performed by the image processing unit has reached at least n times (n is an integer of 1 or more), which is a predesignated number of times.

With this configuration, a second image having a high quality can be obtained using the original pixels corrected by repeating the correction processing a predesignated number of times.

Furthermore, the image processing apparatus of the present invention is such that the pixel value acquiring part acquires the pixel value of each of the new pixels, using the pixel values of all original pixels within a predesignated distance around the position at which that new pixel is disposed.

With this configuration, in particular, an image in which the amount of sharply-edged portions contained therein is small can be made an image having a high quality, by performing the processing for increasing the resolution.

Furthermore, the image processing apparatus of the present invention is such that the first image is an image showing a state inside a living body, the image processing apparatus further includes a distance management information storage unit in which distance management information, which is information having identifying information of a section inside a living body and a distance corresponding to the identifying information of that section, is stored, and the pixel value acquiring part acquires the distance corresponding to the identifying information of the section shown in the first image, from the distance management information, and uses the acquired distance as the predesignated distance.

With this configuration, the pixel values of the new pixels can be acquired using the original pixels contained in a distance that is suitable for a section inside a living body shown in the first image, and, thus, a second image having a high quality according to the section shown in the first image can be obtained.

Furthermore, the image processing apparatus of the present invention is such that the first image is an image showing a state inside a living body, the image processing apparatus further includes a processing number management information storage unit in which processing number management information, which is information having identifying information of a section inside a living body and the number of times corresponding to the identifying information of that section, is stored, and the condition judging part acquires the number of times corresponding to the identifying information of the section shown in the first image, from the processing number management information, and uses the acquired number of times as the value of n.

With this configuration, the pixel values of the new pixels can be acquired using the original pixels corrected the number of times that is suitable for a section inside a living body shown in the first image, and, thus, a second image having a high quality according to the section shown in the first image can be obtained.

Furthermore, the image processing apparatus of the present invention is such that the correction value is a difference between the pixel value of each original pixel of the first image and the representative value of the pixel values of the multiple new pixels arranged in an area in which that original pixel is disposed.

With this configuration, the original pixels are corrected as appropriate by the correction processing, and, thus, a second image having a high quality can be obtained.

Furthermore, the image processing apparatus of the present invention is such that the representative value is an average value of the pixel values of the multiple new pixels arranged in the area in which each of the original pixels is disposed.

With this configuration, appropriate correction values can be acquired, and, thus, a second image having a high quality can be obtained.

Furthermore, the image processing apparatus of the present invention is such that the first image is an image showing a state inside a living body.

With this configuration, an image showing a state inside a living body in which the amount of sharply-edged or linear portions contained therein is small can be made an image having a high quality.

The image processing apparatus according to the present invention can obtain a bitmap image having a higher resolution and a higher quality than those of an original bitmap image.

BRIEF DESCRIPTION OF DRAWINGS

FIG. 4 is a table showing an example of processing number management information of this example.

FIG. 8 is a table showing distance management information of this example.

DETAILED DESCRIPTION

Figure 1:
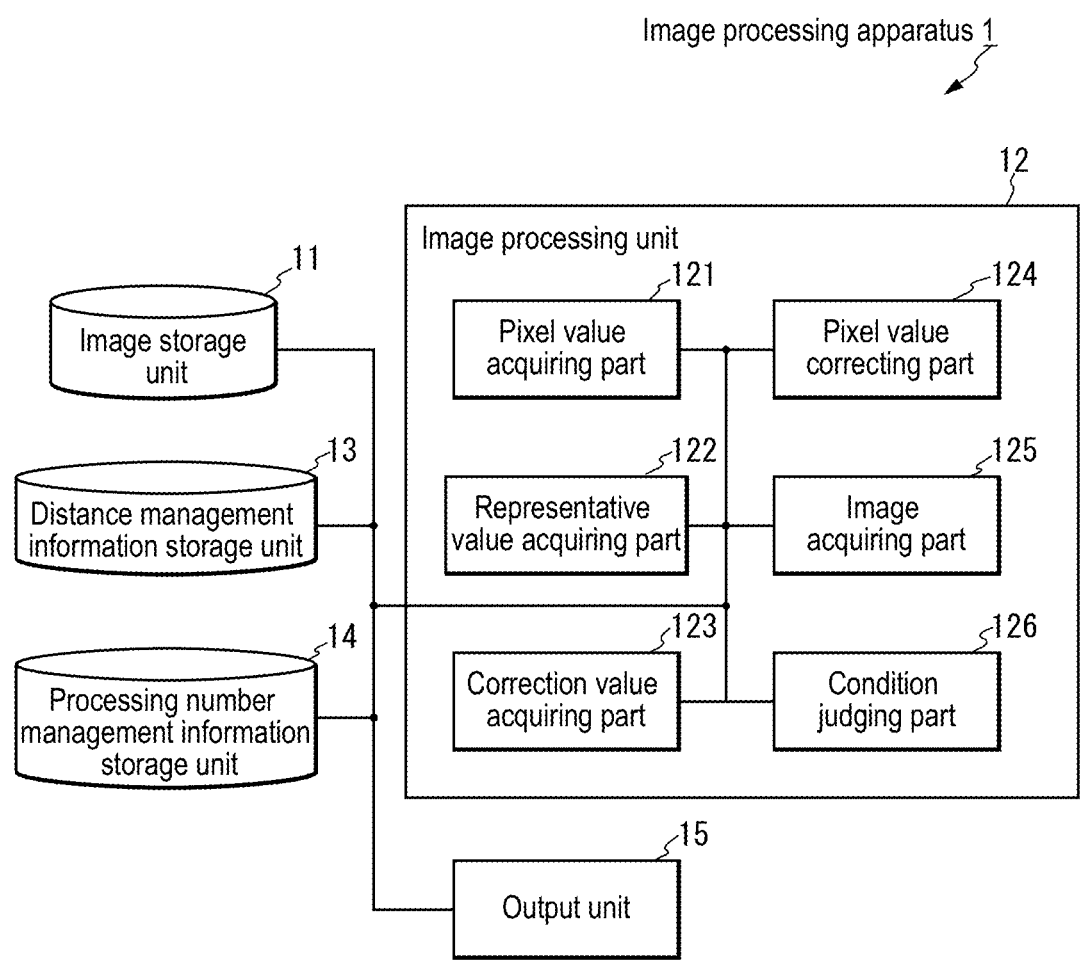
FIG. 1 is a block diagram of an image processing apparatus according to an example of the present invention.

Hereinafter, examples of an image processing apparatus and the like will be described with reference to the drawings. Note that constituent elements denoted by the same reference numerals perform the same operations in the examples, and, thus, a description thereof may not be repeated.

Example

FIG. 1 is a block diagram of an image processing apparatus 1 in this example.

The image processing apparatus 1 includes an image storage unit 11, an image processing unit 12, a distance management information storage unit 13, a processing number management information storage unit 14, and an output unit 15.

The image processing unit 12 includes a pixel value acquiring part 121, a representative value acquiring part 122, a correction value acquiring part 123, a pixel value correcting part 124, a condition judging part 125, and an image acquiring part 126.

In the image storage unit 11, a first image is stored. The first image is a bitmap image that is to be processed by the image processing apparatus 1. Hereinafter, the first image is referred to as a first bitmap image. A bitmap image is an image in which multiple pixels are arranged on a grid. Note that each pixel forming the first bitmap image is referred to as an original pixel. Furthermore, a pixel obtained by correcting the original pixel by performing correction processing (described later) is also referred to as an original pixel as appropriate. There is no limitation on the data format of the bitmap image. Examples of the data format of the bitmap image include JPEG, TIFF, PNG, GIF, BMP, and the like. A bitmap image is also referred to as a raster image. Each pixel forming the bitmap image has a pixel value. The pixel value is a value indicating the color, the density, and the like of each pixel. The pixel value is, for example, a luminance value of that pixel. If the bitmap image is, for example, an image in the RGB color mode, each pixel typically has a luminance value for each of the R value, the G value, and the B value. In this example, the luminance values for the R value, the G value, and the B value may be collectively referred to as a luminance value. The same is applied to the CMYK color mode and the like. Furthermore, if the bitmap image is, for example, an image in the grey scale mode, each pixel typically has a luminance value as the pixel value. Furthermore, if the bitmap image is an image in the HSB color mode, for example, each pixel has values indicating hue, saturation, and brightness as the pixel value. There is no limitation on the number of pixels of the bitmap image, the aspect ratio, the resolution in the output, and the like. The bitmap image is, for example, an image showing a state inside a living body. The image showing a state inside a living body is an image showing a state or an arrangement status of organs, tissues, or the like inside a living body. The image showing a state inside a living body is, for example, a so-called tomographic image. The image showing a state inside a living body is, for example, a medical image acquired by computed tomography (CT), magnetic resonance imaging (MRI), positron emission tomography (PET), single photon emission computed tomography (SPECT), or the like.

The image storage unit 11 is preferably a non-volatile storage medium, but may be realized also by a volatile storage medium. The storing is a concept that encompasses temporarily storing. The same is applied to other storage units below.

The image processing unit 12 acquires a second image, which is a bitmap image obtained by increasing the resolution of the first bitmap image. Hereinafter, the second image is referred to as a second bitmap image. The increasing the resolution is making the resolution higher, that is, realizing a higher resolution. The increasing the resolution may be considered as acquiring a second bitmap image having a larger number of pixels than the first bitmap image, by increasing the number of pixels by interpolating pixels of the first bitmap image. The second bitmap image is, for example, an image obtained by increasing the number of pixels of the first bitmap image so as not to change the aspect ratio. The second bitmap image is, for example, an image obtained by enlarging the first bitmap image so as to increase the number of pixels. For example, the image processing unit 12 repeatedly performs correction processing (described later) once or more on the pixel value of each original pixel forming the first bitmap image, and uses the corrected pixel to acquire a second bitmap image, which is a bitmap image obtained by increasing the number of pixels of the first bitmap image. The repeating the correction processing once refers to performing the correction processing once.

Hereinafter, a case will be described in which the image processing unit 12 includes the pixel value acquiring part 121, the representative value acquiring part 122, the correction value acquiring part 123, the pixel value correcting part 124, the image acquiring part 126, and the condition judging part 125, and acquires a second bitmap image from the first bitmap image using these parts.

The pixel value acquiring part 121 acquires the pixel values of multiple new pixels forming an image acquired by increasing the resolution of the first bitmap image stored in the image storage unit 11. The new pixels are pixels forming an image acquired by increasing the resolution of the first bitmap image, and are new pixels generated for increasing the resolution of the first bitmap image. The new pixels may be considered as new pixels arranged in an area in which each original pixel is disposed. The new pixels are, for example, pixels that are newly generated by performing interpolation or the like on the original pixels. The pixel value acquiring part 121 acquires the pixel value of each new pixel, using the pixel values of the multiple original pixels around the position at which the new pixel is disposed, from among the original pixels forming the first bitmap image. There is no limitation on the values of the resolution increase ratio, the target resolution, the pixel increase ratio (enlargement ratio), the pixel increase number, the total pixel number after the increase, and the like, in the case of increasing the resolution of the first bitmap image, as long as they are positive values. The values of the increase ratio, the total pixel number after increasing the number of pixels of the first bitmap image, and the like may be values designated in advance by default or the like, or may be values designated by the user or the like via an unshown accepting unit or the like. The multiple new pixels arranged in an area in which one original pixel is disposed are, for example, multiple new pixels each having the central coordinates (or the coordinates of one vertex) positioned in the area in which the original pixel is disposed. The multiple new pixels arranged in the area in which the original pixel is disposed may be considered, for example, as multiple new pixels that are arranged so as to divide the area in which the one original pixel is disposed. In the case where the original pixel has multiple pixel values (e.g., luminance values) (e.g., in the case of having the R value, the G value, and the B value), the pixel value acquiring part 121 typically acquires, for each pixel value, the pixel value of the new pixel, in any processing for acquiring the pixel value. The pixel value acquiring part 121 may or may not acquire an image obtained by increasing the resolution of the first bitmap image, in the case of acquiring the pixel values of the new pixels, as long as the pixel values of the new pixels can be acquired. For example, it is also possible not to generate an actual image while merely calculating the identifying information (e.g., coordinates) of each new pixel that is to be acquired in the case of increasing the resolution and the pixel value of that new pixel.

The acquiring the pixel value of the new pixel using the pixel values of the multiple original pixels around the position at which the new pixel is disposed is, for example, calculating the pixel value of the new pixel using the pixel values of the multiple pixels around the position (e.g., coordinates) at which the new pixel is disposed. The position at which the new pixel is disposed refers to the coordinates of the position at which the new pixel is disposed in the first bitmap image. The coordinates are, for example, coordinates in which the minimum unit of the coordinate value is smaller than one pixel of the original pixel. The position at which the original pixel is disposed is typically indicated as the coordinates of the center of the original pixel. Note that the coordinates of one corner or the like of the original pixel may be the information indicating the position at which the original pixel is disposed. The multiple pixels around the position at which the new pixel is disposed may be considered as multiple pixels that are adjacent to or successive to the position at which the new pixel is disposed. The state of pixels being obliquely linked to each other (i.e., contours of pixels being linked to each other at one point) also may be considered as being adjacent to each other. The multiple pixels around the position at which the new pixel is disposed are, for example, multiple original pixels that are arranged so as to surround the position (coordinates) at which the new pixel is disposed. For example, if one new pixel is disposed near the center of M×N original pixels that are arranged in M rows and N columns (N and M are integers of two or more), the pixel value acquiring part 121 may acquire the pixel value of the one new pixel, using the pixel values of the M×N original pixels arranged in M rows and N columns as the pixel values of the multiple pixels around the position at which the one new pixel is disposed. Furthermore, in the case of acquiring the pixel value, pixel values may be weighted in accordance with the distance between the position of the new pixel and that of each original pixel (specifically, may be weighted such that the influence on the new pixel is reduced as the original pixel is positioned farther from the new pixel). Hereinafter, the processing for acquiring the pixel value of the new pixel will be briefly described.

(1) in the Case of Using Existing Interpolation Method

The pixel value acquiring part 121 may acquire the pixel value of the new pixel, for example, using an existing interpolation method, using the pixel values of the multiple pixels around the position at which the new pixel is disposed. The existing interpolation method may be any interpolation method, as long as it is an interpolation method for acquiring the pixel value of the new pixel using the pixel values of the multiple pixels around the position at which the new pixel is disposed, and examples thereof include the nearest neighbor method, the bicubic method, and the like. In view of the quality of the new pixel, the bicubic method is preferably used. Such an existing interpolation method is a known art as described in Non-Patent Document 1, and, thus, a detailed description thereof has been omitted. Note that, in the case where the original pixel has multiple pixel values (e.g., luminance values) as described above, the pixel value acquiring part 121 typically acquires, for each pixel value, the pixel value of the new pixel.

(2) in the Case of Using all Pixels Positioned within Designated Distance

The nearest neighbor method, the bicubic method, and the like as described above are methods for acquiring the pixel value of the new pixel, using the original pixels in a rectangular area (e.g., arranged in 2×2 or 4×4) around the position at which the new pixel is disposed. Meanwhile, the pixel value acquiring part 121 may acquire the pixel value of the new pixel, for example, using the pixel values of all original pixels within a predesignated distance around the position at which that new pixel is disposed. Examples of all original pixels within a predesignated distance around the position at which the new pixel is disposed include, for example, all original pixels within a predesignated distance centered about the position of the new pixel, and all original pixels within a predesignated distance centered about the position of the original pixel that is nearest the position at which the new pixel is disposed, as well as all original pixels within a predesignated distance centered about the position between the position at which the new pixel is disposed and the original pixel that is nearest the position at which the new pixel is disposed. The original pixel that is nearest the position at which the new pixel is disposed may be considered as an original pixel that is disposed in the area including the position at which the new pixel is disposed.

For example, the pixel value acquiring part 121 may acquire the pixel value of the new pixel, using values obtained by weighting the pixel values of all original pixels within a predesignated distance around the position at which the new pixel is disposed, in accordance with the distance between the position at which the new pixel is disposed and the position at which each original pixel is disposed. Specifically, for example, the pixel value acquiring part 121 weights the pixel values of all original pixels within a predesignated distance centered about the position of the new pixel (or the position of the original pixel that is disposed nearest the new pixel), in accordance with the distance between the position at which the new pixel is disposed and the position at which each original pixel is disposed. The pixel value acquiring part 121 may acquire the pixel value of the new pixel using the weighted values.

For example, the pixel value acquiring part 121 acquires, for all original pixels positioned within a predesignated distance, a product of the pixel value of each original pixel and a weighting value in accordance with the distance between that original pixel and the new pixel, and acquires a value obtained by dividing the total of the products by the total of all weighting values used for these products, as the pixel value of the new pixel.

In the case of increasing the number of pixels by interpolating original pixels of an image in which the amount of sharply-edged or linear shapes contained therein is small, the image obtained by acquiring the pixel value of the new pixel using all original pixels within a predesignated distance around the position at which the new pixel is disposed may have a higher quality with less unnatural portions than the image obtained by the bicubic method or the like that acquires the pixel value of the new pixel from the pixel values of multiple pixels forming a rectangular area around the area for generating the new pixel. All original pixels within a predesignated distance around the position at which the new pixel is disposed are specifically all pixels in a circular area centered about the position of the new pixel. For example, structures inside a living body such as a human body seldom have a sharply-edged or linear shape, and, thus, if the first bitmap image is an image inside a living body or the like, a pixel value having a high quality can be acquired as the pixel value of the new pixel, by generating the new pixel using all original pixels positioned within a designated distance.

The weighting value used in this example is preferably a value that reduces the influence of the pixel value that is weighted is reduced as the distance increases, specifically a value that becomes smaller as the distance increases. For example, it may be a weighting value that successively or non-successively becomes smaller, provided at intervals of a length of the distance, or may be a decreasing function that successively or non-successively decreases the value in accordance with a length of the distance, using the length of the distance as a variable. Note that it is preferable that the weighting value successively changes in accordance with an increase in the distance. The weighting value, the function for acquiring the weighting value, and the like may be determined, for example, by an experiment or a simulation.

The predesignated distance centered about the position of the new pixel is preferably at least the distance corresponding to the length of one side of one original pixel.

The distance used by the pixel value acquiring part 121 as the predesignated distance may be a constant distance designated in advance, or may be a distance determined according to the identifying information of a section inside a living body shown in a first bitmap image that is to be processed. Specifically, the pixel value acquiring part 121 may acquire a distance corresponding to the identifying information of a section shown in the first bitmap image, from distance management information (described later) having the identifying information of a section and the distance corresponding to the identifying information of that section, and use the acquired distance as the predesignated distance. That is to say, it is possible to acquire the pixel value of the new pixel, using all original pixels whose distance from the new pixel is within the acquired distance. The identifying information of a section shown in a first bitmap image that is to be processed may be input by the user via an unshown accepting unit or the like. Furthermore, a first bitmap image and the identifying information of a section shown in that image may be stored in advance in association with each other in the image storage unit 11, and the identifying information of the section may be read as well when the first bitmap image is read. The identifying information of a section may be any information with which the section can be identified, and examples thereof include the name of the section, the name of an organ contained in the section, or the code for identifying the section. Furthermore, if the section can be designated according to the position at which the first bitmap image is acquired, the identifying information may be information indicating the position at which the first bitmap image is acquired.

It is assumed that, if the pixel value acquiring part 121 acquires pixel values of multiple new pixels, using the pixel values of the multiple original pixels around the position at which each new pixel is disposed, the pixel values of the original pixels have been corrected by the pixel value correcting part 124 repeating correction processing (described later) once or at least twice. In this case, the pixel value acquiring part 121 acquires the pixel value of the new pixels, using the corrected pixel values as the pixel values of the original pixels.

The representative value acquiring part 122 acquires a representative value of the pixel values of the multiple new pixels, acquired by the pixel value acquiring part 121, arranged in an area in which each original pixel of the first bitmap image is disposed. The new pixels arranged in the area in which the original pixel is disposed are, for example, new pixels whose predetermined position such as the center has coordinates positioned in the area in which the original pixel is disposed. Furthermore, the new pixels arranged in the area in which the original pixel is disposed may be new pixels at least partially positioned in the area in which the original pixel is disposed. The representative value of the multiple new pixels is a value representing the multiple new pixels. The representative value is typically an average value of the pixel values of the multiple new pixels, but may be a weighted average value obtained by performing weighting in accordance with the positional relationship in the area in which the original pixel is disposed, a median value, or the like. Furthermore, the representative value may be an average value of the multiple new pixels forming predesignated part of the multiple new pixels. For example, the representative value may be an average value of the new pixels excluding a new pixel having the lowest pixel value. Note that, in the case where each pixel has multiple pixel values (e.g., in the case of having the R value, the G value, and the B value), for example, the representative value acquiring part 122 acquires the average value for each pixel value.

The correction value acquiring part 123 acquires a correction value using the pixel value of each of the original pixels of the first bitmap image and the representative value acquired by the representative value acquiring part 122 for the area in which the original pixel is disposed. Specifically, the correction value acquiring part 123 performs, on each original pixel forming the first bitmap image, the processing for acquiring a correction value using the pixel value of one original pixel of the first bitmap image and the representative value of the pixel values of the multiple new pixels arranged in the area in which the one original pixel is disposed. The correction value acquired by the correction value acquiring part 123 is, for example, a value for performing the correction for decreasing the pixel value of the original pixel in the case where the representative value of the pixel values of the multiple new pixels is large with respect to the pixel value of the original pixel, and for performing the correction for increasing the pixel value of the original pixel in the case where the representative value of the pixel values of the multiple new pixels is small with respect to the pixel value of the original pixel. The correction value acquired by the correction value acquiring part 123 is, for example, a difference between the pixel value of each original pixel of the first bitmap image and the representative value of the pixel values of the multiple new pixels arranged in the area in which that original pixel is disposed. For example, a value obtained by subtracting the pixel value of one original pixel, from the representative value of the pixel values of the multiple new pixels positioned in the area in which the one original pixel is disposed, is the correction value. Alternatively, a value obtained by subtracting the representative value of the pixel values of the multiple new pixels positioned in an area in which one original pixel is disposed, from the pixel value of the one original pixel, may be taken as the correction value. Furthermore, the correction value may be a value obtained by performing a predesignated operation on a difference between the representative value of the pixel values of the multiple new pixels arranged in an area in which each original pixel is disposed and the pixel value of that original pixel. For example, the correction value may be a value obtained by multiplying a predesignated coefficient by the difference. Furthermore, the correction value may be a value obtained by rounding the number below a predetermined digit of the difference. Furthermore, the correction value may be a value other than those described above, and examples thereof include a value indicating the proportion of the pixel value of the original pixel with respect to the representative value of the multiple new pixels. Furthermore, the correction value acquiring part 123 may use the representative value of the multiple new pixels acquired by the representative value acquiring part 122, as the correction value. In this case, the correction value acquiring part 123 may be considered also to function as the representative value acquiring part 122.

If the pixel value of the original pixel has been already corrected by the pixel value correcting part 124 repeating correction processing (described later) once or at least twice, the correction value acquiring part 123 acquires a correction value using the corrected pixel value of the original pixel and the representative value of the pixel values of the multiple new pixels. Note that the pixel value of each new pixel in this case is a value acquired using the corrected pixel values of the multiple original pixels. For example, the correction value acquired for one original pixel by the correction value acquiring part 123 after the correction processing is performed S times (S is an integer of 1 or more) (i.e., the correction value used in an (S+1)-th correction processing) is a difference between the pixel value of the original pixel corrected by the S-th correction processing and the representative value of the pixel values of the multiple new pixels acquired using the pixel values of the multiple original pixels corrected by the S-th correction processing. In the (S+1)-th correction processing, this correction value is used to correct the pixel value of the original pixel corrected by the S-th correction processing.

The pixel value correcting part 124 corrects the pixel value of each original pixel of the first bitmap image, using the correction value acquired by the correction value acquiring part 123. Specifically, the pixel value correcting part 124 corrects the pixel value of each original pixel of the first bitmap image, using the correction value acquired for that original pixel by the correction value acquiring part 123. The correction performed by the pixel value correcting part 124 is, for example, processing for decreasing the pixel value of the original pixel using the above-described correction value in the case where the representative value of the pixel values of the multiple new pixels is large with respect to the pixel value of the original pixel. Furthermore, the correction performed by the pixel value correcting part 124 is, for example, processing for increasing the pixel value of the original pixel using the above-described correction value in the case where the representative value of the pixel values of the multiple new pixels is small with respect to the pixel value of the original pixel. For example, it is assumed that the correction value acquired for one original pixel of the first bitmap image by the correction value acquiring part 123 is a value obtained by subtracting the pixel value of one original pixel from the representative value of the pixel values of the multiple new pixels arranged in the area in which that original pixel is disposed. In this case, for example, the pixel value correcting part 124 acquires a pixel value obtained by subtracting the correction value from the pixel value of the one original pixel, as the pixel value after the correction of the one original pixel.

Furthermore, for example, it is assumed that the correction value acquired for one original pixel of the first bitmap image by the correction value acquiring part 123 is a value obtained by subtracting the representative value of the pixel values of the multiple new pixels arranged in the area in which one original pixel is disposed, from the pixel value of that original pixel. In this case, for example, the pixel value correcting part 124 acquires a pixel value obtained by adding the correction value to the pixel value of the one original pixel, as the pixel value after the correction of the one original pixel.

Furthermore, the processing for correcting the pixel value of the original pixel using the correction value may be changed according to the type of correction value. For example, if the correction value is a value indicating the proportion of the pixel value of one original pixel with respect to the representative value of the multiple new pixels arranged in the area in which the one original pixel is disposed, the correction value may be multiplied by the pixel value of the original pixel.

If the correction processing (described later) is repeated twice or more, that is, if the pixel value correcting part 124 repeatedly corrects the pixel value of the original pixel twice or more, in the second and subsequent corrections, the pixel value correcting part 124 further corrects the pixel value of the original pixel corrected by the correction immediately therebefore. That is to say, the pixel value of the original pixel of the first bitmap image that is to be corrected by L-th and subsequent corrections (L is an integer of 2 or more) may be considered as the pixel value of the original pixel corrected by an (L−1)-th correction.

In this example, the above-described processing in which the pixel value acquiring part 121 acquires the pixel values of new pixels, the representative value acquiring part 122 acquires a representative value of the pixel values of the multiple new pixels, the correction value acquiring part 123 acquires multiple correction values, and the pixel value correcting part 124 corrects the pixel value of each original pixel of the first bitmap image is referred to as correction processing. In this example, it is assumed that the image processing unit 12 repeats the correction processing once or at least twice. In the case where the correction processing is repeated, the pixel value of the original pixel used in the L-th and subsequent corrections (L is an integer of 2 or more) may be considered as the pixel value of the original pixel corrected by the (L−1)-th correction.

Hereinafter, a case will be described in which the condition judging part 125 judges whether or not a predesignated end condition is satisfied, and the image processing unit 12 ends the repetition of the correction processing if it is judged that the end condition is satisfied. Note that, for example, a predesignated number of programs for executing the correction processing once may be prepared, and all of these programs may be sequentially executed so that the correction processing is performed the predetermined number of times. In this case, the condition judging part 125 may be omitted.

The condition judging part 125 judges whether or not a predesignated end condition is satisfied, for example, each time the correction processing is performed once. In this example, cases will be described in which the predesignated end condition is (A) a condition regarding the number of repetitions, (B) a condition regarding a difference between the original pixel value of the original pixel before the correction processing and the pixel value of the original pixel corrected by the correction processing, and (C) a condition regarding a difference between the pixel value of the original pixel corrected by performing the correction processing once and the pixel value of the original pixel before performing this one time of correction processing.

(A) Condition Regarding the Number of Repetitions

For example, the condition judging part 125 judges that the end condition is satisfied if the number of repetitions of the correction processing performed by the image processing unit 12 reaches at least n times (n is an integer of 1 or more), which is a predesignated number of times. The n times may be considered as a so-called threshold value. For example, each time the pixel value correcting part 124 ends the correction of the pixel value of the original pixel, the number of times of the correction processing is counted using a counter or the like, and it is judged that the end condition is satisfied if the count number reaches at least n times. The value of n indicating the number of times of processing may be a value designated in advance, or may be a value acquired according to the identifying information of a section inside a living body shown in a first bitmap image that is to be processed. For example, the condition judging part 125 acquires the number of times corresponding to the identifying information of a section shown in the first bitmap image that is to be processed, from processing number management information, which is information having the identifying information of a section inside a living body and the number of times corresponding to the identifying information of that section inside the living body, stored in the processing number management information storage unit 14 (described later). The condition judging part 125 may use the acquired number of times, as the value of n. The identifying information of a section of the first bitmap image may be acquired by processing similar to that performed by the pixel value acquiring part 121 for acquiring the identifying information of a section of the first bitmap image.

(B) Condition Regarding Difference Between the Original Pixel Value of the Original Pixel Before the Correction Processing and the Pixel Value of the Original Pixel Corrected by the Correction Processing For example, the condition judging part 125 compares the pixel value of each original pixel of the first bitmap image before the correction processing and the representative value of the pixel values of the multiple new pixels, of the second bitmap image, arranged in the area in which that original pixel is disposed, and judges that the end condition is satisfied if a predesignated condition is satisfied by a result of the comparison. The representative value of the pixel values of the multiple new pixels, of the second bitmap image, arranged in the area in which each original pixel is disposed is, for example, a representative value of the multiple new pixels acquired by the pixel value acquiring part 121 after one time of the correction processing is completed. If the predesignated condition is not satisfied by a result of the comparison, it is judged that the end condition is not satisfied. The state before the correction processing refers to a state in which the correction processing has not been performed yet. That is to say, the first bitmap image before the correction processing refers to an original first bitmap image in a state before the image processing unit 12 performs the correction processing. The comparison is, for example, judging which of the pixel value of the original pixel and the representative value of the pixel values of the new pixels is larger or smaller. The comparison may be considered, for example, as obtaining a difference between the pixel value of the original pixel and the representative value of the pixel values of the new pixels. In this case, the predesignated condition being satisfied by a result of the comparison refers to a state in which the absolute value of the difference between the pixel value of the original pixel and the representative value of the pixel values of the new pixels is smaller than a predesignated value. Alternatively, in this case, the predesignated condition being satisfied by a result of the comparison may be considered as a state in which the difference between the pixel value of the original pixel and the representative value of the pixel values of the new pixels is within a range of predesignated values including the value "0". The predesignated values, and the upper limit value and the lower limit value indicating the value range may be considered as threshold values.

For example, it is assumed that the pixel value of one original pixel of the original first bitmap image before the correction processing is Original1 and the representative value of the multiple new pixels arranged in the area in which the one original pixel is disposed, acquired by the pixel value acquiring part 121 after the correction processing is repeated three times, is Average3. In this case, the condition judging part 125 judges that the end condition is satisfied if (Original1)−(Average3)<(Predesignated value). That is to say, it is possible to compare the pixel value of the original pixel and the representative value of the pixel values of the multiple new pixels arranged in the area in which the original pixel is disposed, acquired during the correction processing, and, if the difference therebetween becomes sufficiently small, determine to end the repetition of the correction processing.

(C) Condition Regarding Difference Between the Pixel Value of the Original Pixel Corrected by Performing the Correction Processing Once and the Pixel Value of the Original Pixel Before Performing this One Time of the Correction Processing For example, each time the image processing unit 12 performs the correction processing once, the condition judging part 125 compares the pixel value obtained by the pixel value correcting part 124 correcting the pixel value of each original pixel of the first bitmap image and the pixel value of that original pixel before performing the correction processing once, and judges that the end condition is satisfied if a predesignated condition is satisfied by a result of the comparison. That is to say, each time the correction processing is performed once, the pixel values of the original pixel before and after the correction processing are compared, and it is judged that the end condition is satisfied if a predesignated condition is satisfied by a result of the comparison. If the predesignated condition is not satisfied by a result of the comparison, it is judged that the end condition is not satisfied. The comparison is, for example, comparing the sizes of the pixel values before and after one time of the correction, as in the case of (B) above. The comparison may be considered, for example, as obtaining a difference between the pixel values before and after one time of the correction. In this case, the predesignated condition being satisfied by a result of the comparison may be considered as a state in which the absolute value of the difference between the pixel values is smaller than a predesignated value or a state in which the difference between the pixel values is within a range of predesignated values including the value "0". The predesignated values, and the upper limit value and the lower limit value indicating the value range may be considered as threshold values.

For example, it is assumed that the corrected pixel value of one original pixel of the first bitmap image obtained by repeating the correction processing twice is Original2 and the corrected pixel value of the original pixel obtained by repeating the correction processing three times is Original3. In this case, the condition judging part 125 judges that the end condition is satisfied if (Original3)−(Original2)<(Predesignated value). Accordingly, the image processing unit 12 ends the repetition of the correction processing. That is to say, it may be considered that the repetition of the correction processing is ended if the pixel value of the original pixel obtained by repeating the correction processing and the previous pixel value of the original pixel are compared and the degree of the change becomes sufficiently small.

In the processing of (B) and (C) above, the judgment to end the repetition of the correction processing may be individually performed on each original pixel of the first bitmap image, and the correction processing may be ended sequentially from the original pixel judged to satisfy the end condition. Then, if all original pixels or a predesignated number or proportion of original pixels are judged to satisfy the end condition, the correction processing on all original pixels may be ended. That is to say, the number of times that the correction processing is performed may be different for each original pixel.

Alternatively, the judgment to end the repetition of the correction processing may be individually performed on each original pixel of the first bitmap image, and, if the number of original pixels judged to satisfy the end condition or the proportion of such original pixels with respect to all original pixels reaches at least a predesignated value, the correction processing on all original pixels may be ended.

Furthermore, the processing of (A), (B), and (C) above may be used as appropriate in a combination of two or more.

Furthermore, the condition judging part 125 may judge whether or not to end the repetition of the correction processing, by performing judgment processing other than those described above.

If the condition judging part 125 judges that the end condition is satisfied, the image processing unit 12 ends the correction processing.

The image acquiring part 126 acquires a second bitmap image, which is a bitmap image configured by multiple new pixels having the pixel values acquired by the pixel value acquiring part 121. For example, the image acquiring part 126 acquires a second bitmap image configured by multiple new pixels having the pixel values acquired by the pixel value acquiring part 121 using the pixel values of the multiple original pixels corrected by repeating the correction processing, in the case where the repetition of the correction processing is ended. For example, using the pixel values of new pixels acquired for each original pixel by the pixel value acquiring part 121, the image acquiring part 126 acquires a second bitmap image configured by the new pixels having the pixel values. The acquiring a bitmap image may be considered as acquiring image data of the bitmap image. The pixel value acquired by the pixel value acquiring part 121 using the pixel values of the multiple original pixels corrected by repeating the correction processing is, for example, in the case of (A), the pixel value of the new pixel acquired by the pixel value acquiring part 121 using the original pixels after the correction after the repetition of the correction processing is ended. Furthermore, the pixel value acquired by the pixel value acquiring part 121 using the pixel values of the multiple original pixels corrected by repeating the correction processing, for example, in the case of (B) or (C), the pixel value of the new pixel acquired by the pixel value acquiring part 121 immediately before the condition judging part 125 judges that the end condition is satisfied. If the pixel value acquiring part 121 acquires an image configured by new pixels in the case of acquiring pixel values of new pixels whose resolution has been increased, the configuration of the pixel value acquiring part 121 for acquiring an image configured by new pixels may be realized as part of the configuration of the image acquiring part 126 for acquiring an image whose resolution has been increased. The pixel value acquiring part 121 acquiring an image configured by new pixels may be considered as the image acquiring part 126 acquiring an image whose resolution has been increased. Alternatively, if the pixel value acquiring part 121 acquires an image configured by new pixels in the case of acquiring pixel values of new pixels whose resolution has been increased, the image configured by the new pixels acquired by the pixel value acquiring part 121 may be acquired by the image acquiring part 126.

In the distance management information storage unit 13, one or more pieces of distance management information, each of which is information having the identifying information of a section inside a living body and the distance corresponding to the identifying information of that section, are stored. The distance corresponding to the identifying information of the section is, for example, a distance that is preferable as the predesignated distance used by the pixel value acquiring part 121 for performing the process that increases the resolution of an image of the section indicated by the identifying information of the section.

In the processing number management information storage unit 14, one or more pieces of processing number management information, each of which is information having the identifying information of a section inside a living body and the number of times corresponding to the identifying information of that section, are stored. The number of times corresponding to the identifying information of the section is, for example, the number of times that is preferable as the number of repetitions in the case of repeatedly performing the above-described correction processing once or more on an image of the section indicated by the identifying information of the section.

The output unit 15 outputs the second bitmap image acquired by the image processing unit 12. The output is a concept that encompasses displaying on a display screen, projection using a projector, printing with a printer, transmission to an external apparatus, accumulation in a storage medium, delivery of a processing result to another processing apparatus or another program, and the like.

The output unit 15 may be considered to include or not to include an output device such as a display screen. The output unit 15 may be realized, for example, by driver software for an output device, a combination of driver software for an output device and the output device, or the like.

Next, an operation of the image processing apparatus 1 will be described with reference to the flowchart in FIG. 1. For example, a case will be described in which the end condition for the repetition of the correction processing is the number of times of correction as shown in (A) above.

(Step S101) The condition judging part 125 substitutes 0 for a counter p.

(Step S102) The pixel value acquiring part 121 reads the first bitmap image that is to be processed, stored in the image storage unit 11, to a memory or the like.

(Step S103) The condition judging part 125 acquires the identifying information of a section of the first bitmap image read in step S102.

(Step S104) The condition judging part 125 acquires the value of n indicating the number of times of correction associated with the identifying information of the section acquired in step S103, using the processing number management information stored in the processing number management information storage unit 14.

(Step S105) The pixel value acquiring part 121 acquires the pixel value of each new pixel forming an image that is obtained by increasing the resolution of the first bitmap image read in step S102. The increase ratio, the target resolution, and the like, in the case of increasing the resolution, may be a resolution specified by default, or may be a resolution specified by the user, for example. Furthermore, the interpolation method used for acquiring the pixel value of a new pixel using the original pixels forming the first bitmap image may be any method as long as it is an interpolation method using the multiple original pixels arranged around the position at which the new pixel is disposed, such as the bicubic method. Note that, in the case where the original pixel has multiple pixel values (e.g., in the case of having the R value, the G value, and the B value, which are multiple luminance values, as the multiple pixel values), the pixel value and the like may be acquired for each pixel value. The same is applied to the description below.

(Step S106) The pixel value correcting part 124 substitutes 1 for a counter q.

(Step S107) The representative value acquiring part 122 acquires pixel values of multiple new pixels arranged in an area in which a q-th original pixel of the first bitmap image is disposed. For example, multiple new pixels arranged in the area in which the q-th original pixel is disposed are detected using the coordinates or the like of the new pixels, and the pixel value of each detected new pixel is acquired.

(Step S108) The representative value acquiring part 122 acquires a representative value (e.g., an average value) using the pixel values of the multiple new pixels acquired in step S107.

(Step S109) The correction value acquiring part 123 acquires a correction value using the pixel value of the q-th original pixel and the representative value acquired in step S108. For example, the correction value acquiring part 123 acquires a value obtained by subtracting the pixel value of the q-th original pixel from the representative value, as the correction value.

(Step S110) The pixel value correcting part 124 corrects the pixel value of the q-th original pixel, using the correction value acquired in step S109. For example, the pixel value correcting part 124 subtracts the correction value from the pixel value of the q-th original pixel, the correction value being acquired by subtracting the pixel value of the q-th original pixel from the representative value in step S109. The pixel value correcting part 124 updates the value of the q-th pixel value of the first bitmap image read to the memory in step S102, to the corrected pixel value. For example, the pixel value correcting part 124 overwrites the value of the q-th pixel value. Note that the pixel value correcting part 124 may newly generate a first bitmap image after the correction, including pixels having the pixel values acquired by the correction as the original pixels, in a storage medium such as a memory or a hard disk, instead of updating each original pixel of the first bitmap image read to the memory in step S102.

(Step S111) The pixel value correcting part 124 increments the counter q by 1.

(Step S112) The representative value acquiring part 122 judges whether or not there is a q-th original pixel. If there is, the procedure returns to step S107, and, if not, the procedure advances to step S113.

(Step S113) The condition judging part 125 increments the counter p by 1.

(Step S114) The condition judging part 125 judges whether or not the value of the counter p has reached at least the value of n acquired in step S104. If the value has reached at least the value of n, the procedure advances to step S116, and, if not, the procedure advances to step S115. Note that the following processing is performed using the original pixels corrected in step S110 as the original pixels of the first bitmap image stored in the image storage unit 11.

(Step S115) The pixel value acquiring part 121 acquires the pixel value of each new pixel forming an image that is obtained by increasing the resolution of the first bitmap image configured by the original pixels corrected in step S110, as in the processing in step S105. The procedure advances to step S106.

(Step S116) The pixel value acquiring part 121 acquires the pixel value of each new pixel forming an image that is obtained by increasing the resolution of the first bitmap image configured by the original pixels corrected in step S110, as in the processing in step S105.

(Step S117) The image acquiring part 126 acquires a second bitmap image, which is an image obtained by increasing the resolution of the first bitmap image, using the pixel values of the new pixels acquired in step S116.

(Step S118) The output unit 15 outputs the second bitmap image acquired in step S117. The procedure is ended.

Figure 2:
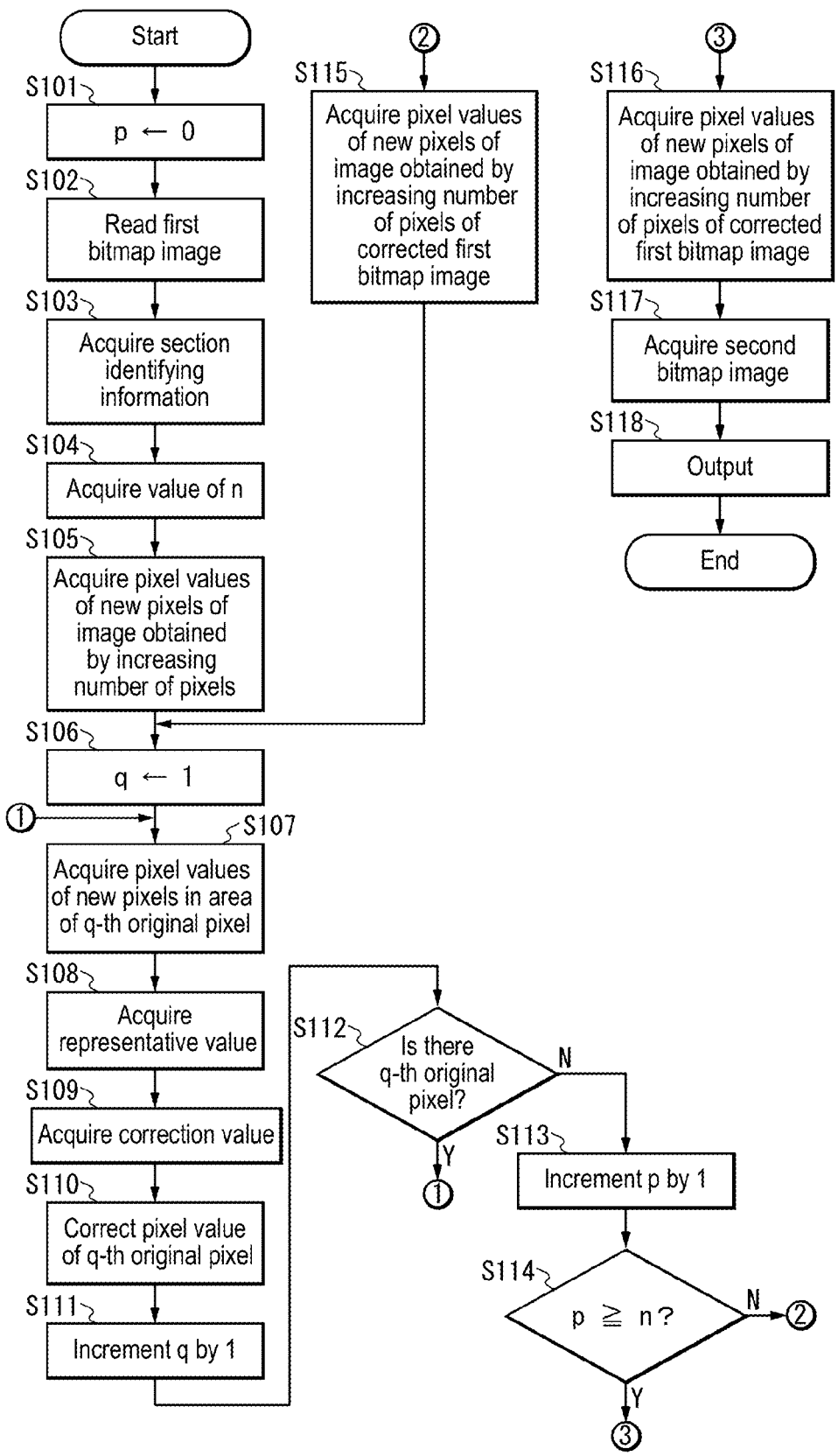
FIG. 2 is a flowchart illustrating an operation of this example.

Note that the procedure is terminated by powering off or an interruption at completion of the process in the flowchart in FIG. 2.

Hereinafter, a case will be described in which the end condition for the repetition of the correction processing above is a condition regarding a difference between the original pixel value of the original pixel before the correction processing and the pixel value of the original pixel corrected by the correction processing as shown in (B) above. In this case, for example, in the flowchart shown in FIG. 2, the processes in steps S101, S113, and S114 regarding the number p of repetitions of the correction processing are omitted, and, if it is judged in step S112 that there is no q-th original pixel, the procedure advances to step S115. Furthermore, immediately after step S115, the condition judging part 125 calculates a difference between each original pixel of the original first bitmap image whose original pixels have not been corrected and an average value of the pixel values of the multiple new pixels arranged in the area in which that original pixel is disposed, among the new pixels acquired in step S115 immediately before, and judges whether or not the difference is a predesignated threshold value or less. Then, if a predesignated proportion (or number) of original pixels among all original pixels forming the first bitmap image are judged to have a difference that is the threshold value or less, the correction processing may be ended and the procedure may advance to step S117. If not, the procedure advances to step S106. Note that the judgment result regarding the predesignated proportion (or number) of original pixels among all original pixels forming the first bitmap image may be a judgment result regarding all original pixels. In this case, step S116 may be omitted. Furthermore, the original first bitmap image used for calculating a difference from the average value may be, for example, read to a memory or the like separately from that read in step S102. Furthermore, the first bitmap image read in step S102 may not be updated with the original pixels corrected in step S110, and a new first bitmap image after the correction configured by the corrected original pixels may be generated. As the original first bitmap used for calculating a difference from the average value, the image read in step S102 may be used.

Hereinafter, a case will be described in which the end condition for the repetition of the correction processing above is a condition regarding a difference between the pixel value of the original pixel corrected by performing the correction processing once and the pixel value of the original pixel before performing this one time of the correction processing as shown in (C) above. For example, in the flowchart shown in FIG. 2, the process in step S114 is omitted, and, in the case of acquiring a first bitmap image configured by the original pixels corrected in step S110, the first bitmap image configured by the corrected original pixels acquired in the step S110 in the repetition immediately before the correction processing is left. Then, immediately after step S113, it is judged whether or not the value of the counter p indicating the number of repetitions is 2 or more. If the value is 2 or more, it is judged whether or not a difference between the pixel values of each original pixel of the first bitmap image acquired in step S110 immediately before and each original pixel disposed at the same position as the above-mentioned pixel, of the first bitmap image acquired in the correction processing in the repetition immediately before, is a predesignated threshold value or less. Then, if a predesignated proportion (or number) or less of original pixels are judged to have a difference that is the threshold value or less, it may be judged to end the repetition of the correction processing and the procedure may advance to step S116. If not, the procedure may advance to step S115. The predesignated proportion (or number) is similar to that in the case of (B). Furthermore, if the value of the counter p is 1, the above-described comparison processing and the like may be performed using the original first bitmap image instead of the first bitmap image acquired in the correction processing in the repetition immediately before.

Hereinafter, a specific operation of the image processing apparatus 1 in this example will be described. Hereinafter, a case will be described in which the end condition for the repetition of the correction processing is the number of times of correction shown in (A) above. There is no limitation on the form of the image processing apparatus 1, and examples thereof include a desktop apparatus, a tablet apparatus, and a portable apparatus such as a so-called smartphone.

Figure 3:
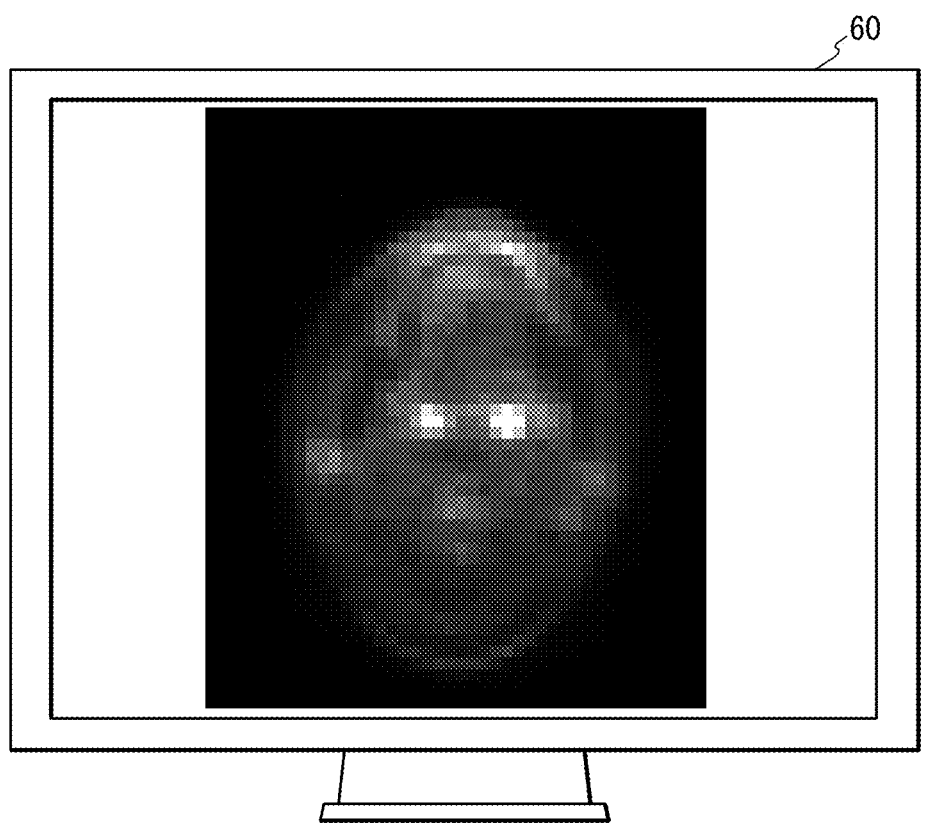
FIG. 3 is a view showing a display example of a first bitmap image of this example.

FIG. 3 is a view showing a display example in which the first bitmap image stored in the image storage unit 11 is displayed on a monitor 60 of the image processing apparatus 1. In this example, it is assumed that the first bitmap image is displayed at the display resolution of the monitor. It is assumed that the first bitmap image is one PET image acquired from the head of a human body. The first bitmap image is associated with the section identifying information "head" and is stored in the image storage unit 11. This image has a matrix size, that is, numbers of pixels in the vertical and horizontal directions of 128×128 pixels.

It is assumed that the user gives an instruction to increase the resolution of the first bitmap image shown in FIG. 3 to the image processing apparatus 1, for example, by operating a menu or the like using an unshown input device or the like such as a keyboard or a mouse. The resolution after the change in the case of increasing the resolution is designated in advance by default or the like. For example, it is assumed that the matrix size after the change is set in advance to 1408×1408 pixels. That is to say, the image processing apparatus 1 is set in advance so as to change each of the numbers of pixels in the vertical and horizontal directions of the first bitmap image to 11 times.

The condition judging part 125 resets the value of the counter p for counting the number of times of the correction processing. Specifically, 0 is substituted for the counter p.

The pixel value acquiring part 121 reads the first bitmap image shown in FIG. 3 from the image storage unit 11 to a memory or the like.

The condition judging part 125 acquires the section identifying information "head" associated with the first bitmap image shown in FIG. 3 from the image storage unit 11.

FIG. 4 is a table showing the processing number management information stored in advance in the processing number management information storage unit 14. The processing number management information has attributes "section ID" and "n". In the table, "section ID" is section identifying information, and "n" is a value of n indicating the number of repetitions of the correction processing. The value of n may be considered as a condition value, a judgment value, or a threshold value. In FIG. 4, each record (row) shows the processing number management information. Note that the processing number management information in this example is shown for the sake of convenience of the description, and may be different from processing number management information that is optimal for an image of each actual section.

The condition judging part 125 detects a record with the value of "section ID" matching the section identifying information "head" acquired in the above-described processing, from among the records of the processing number management information shown in FIG. 4, and acquires the value of n of the detected record. In this case, "3" is acquired as the value of n.

The pixel value acquiring part 121 acquires the pixel value of each new pixel forming an image that is obtained by increasing the resolution of the first bitmap image shown in FIG. 3 read to the memory in the above-described processing, specifically, by changing the matrix size of the first bitmap image to 1408×1408 pixels described above. In this case, for example, the process is performed that changes the matrix size of the first bitmap image from 128×128 pixels to 1408×1408 pixels, using, as the interpolation method of the original pixels, the method using the pixel values of all original pixels within a predesignated distance around the position at which the new pixel is disposed as described in (2) above. Accordingly, the pixel value of each pixel of an image whose resolution has been increased, that is, of each new pixel, is acquired. The interpolation method used in this example will be specifically described later. Furthermore, as the interpolation method, the bicubic method or the like may be used instead of the above-described interpolation method. For example, a pair of the coordinates indicating the position at which each new pixel is disposed and the pixel value of that new pixel is acquired. It is assumed that the central coordinates of each new pixel are used as an example of the coordinates indicating the position at which that new pixel is disposed. Furthermore, in this example, a case will be described in which the first bitmap image is an image whose color mode is the RGB mode and the pixel value acquiring part 121 acquires the R value, the G value, and the B value that are pixel values of the new pixel, using three luminance values that are pixel values of the original pixels, that is, the R value, the G value, and the B value.

Next, the image processing unit 12 corrects the pixel values of the original pixels of the first bitmap image. For example, it is assumed that the pixel values of the original pixels of the first bitmap image are corrected sequentially from the left to the right of the pixels in the uppermost row. The similar processing is performed sequentially on the rows after the uppermost rows.

In the correction of the pixel values, first, the representative value acquiring part 122 acquires the pixel values of multiple new pixels arranged in an area in which one original pixel forming the first bitmap image is disposed. Specifically, the representative value acquiring part 122 detects multiple sets of coordinates indicating positions in an area in which one original pixel is disposed, from among the coordinates indicating the positions of the new pixels (the central coordinates of the new pixels) acquired by the pixel value acquiring part 121 in the above-described processing, and acquires each pixel value (the R value, the G value, and the B value) associated with the detected multiple sets of coordinates. The representative value acquiring part 122 calculates, for each pixel value, a representative value of the pixel values associated with the acquired multiple sets of coordinates, that is, an average value for example.

The correction value acquiring part 123 acquires a correction value using the pixel value of the one original pixel and the average value acquired in step S108. In this case, a value obtained by subtracting the pixel value of the one original pixel from the average value is acquired as the correction value.

The pixel value correcting part 124 corrects the pixel value of the one original pixel using the correction value acquired for that one original pixel by the correction value acquiring part 123. The correcting is subtracting the correction value acquired for the one original pixel from the pixel value of the one original pixel. Then, the pixel value correcting part 124 updates the pixel value of the one original pixel of the first bitmap image read to the memory in step S102, to the corrected pixel value. This processing is performed also on other original pixels.

Figure 5:
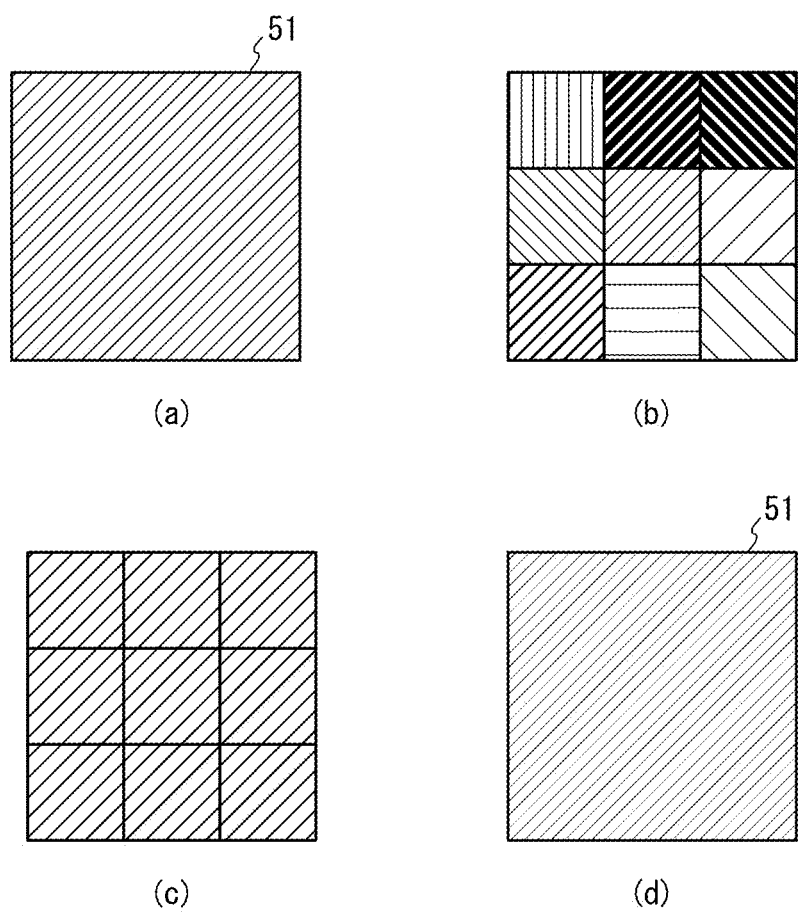
FIG. 5 shows schematic diagrams illustrating processing for correcting a pixel value of this example.

FIGS. 5(*a*) to 5(*d*) are schematic diagrams illustrating a main portion of the processing for correcting the pixel value of the original pixel.

In order to simplify the description, a case will be described in which the pixel value acquiring part 121 acquires the pixel value of the new pixel that is obtained by increasing the resolution of the first bitmap image to 300% (i.e., 3 times). The increasing the resolution to 300% refers to increasing each of the numbers of pixels in the vertical and horizontal directions of the first bitmap image to 300%, that is, increasing the total number of pixels to 9 times. That is to say, this processing refers to arranging nine new pixels in an area in which one original pixel has been disposed.

For example, in the case of increasing the resolution of the first bitmap image to 300%, the resolution of an area in which one original pixel 51 of the first bitmap image is disposed as shown in FIG. 5(*a*) is increased to generate nine new pixels as shown in FIG. 5(*b*). The nine new pixels have pixel values different from each other because they are set in accordance with the positional relationship with original pixels around each new pixel following the interpolation method such as the bicubic method.

The representative value acquiring part 122 acquires the pixel values of the nine new pixels positioned in the area in which the one original pixel 51 is disposed. The representative value acquiring part 122 acquires an average value of the pixel values as the representative value. Assuming that all pixel values of the nine new pixels are equal to this average value, the state as shown in FIG. 5(*c*) is obtained. A comparison shows that the pixel group of the nine new pixels and the one original pixel 51 have pixel values different from each other.

The correction value acquiring part 123 acquires a correction value by subtracting the pixel value of the original pixel 51 from the average value of the pixel values of the new pixels. The correction value acquiring part 123 subtracts the correction value from the pixel value of the original pixel 51, thereby correcting the pixel value of the original pixel 51. FIG. 5(*d*) is a diagram showing the corrected original pixel 51. The pixel value of the original pixel 51 shown in FIG. 5(*a*) is updated to the corrected original pixel 51. In the following processing, the updated pixel value is used as the pixel value of the original pixel 51. Furthermore, in the case of further performing correction with the correction processing, the original pixel shown in FIG. 5(*d*) is updated.

If the processing for correcting the pixel value is completed for all original pixels of the first bitmap image, the condition judging part 125 increments the counter p indicating the number of times of the correction processing by 1. In this case, the value of p becomes "1".

The condition judging part 125 judges whether or not the value of the counter p has reached at least the value of n acquired for the first bitmap image. In this case, since the value of p is "1" and the value of n is "3", it is judged that the value has not reached at least the value of n. Accordingly, the image processing unit 12 repeatedly performs the correction processing as described above. That is to say, the correction processing in which the pixel value acquiring part 121 acquires the pixel values of new pixels, the representative value acquiring part 122 acquires a representative value of the pixel values of the new pixels, the correction value acquiring part 123 acquires correction values, and the pixel value correcting part 124 corrects the pixel value of each original pixel of the first bitmap image is repeatedly performed until the value of the counter p reaches at least "3", which is the value of n. Note that, in the case of repeating the correction processing, new pixels and the like are acquired using the corrected pixel value of the original pixel as the pixel value of the original pixel of the first bitmap image. The correction processing is processing for correcting the pixel value of the original pixel of the first bitmap image, and, thus, the number of pixels of the first bitmap image does not increase even in the case where the correction processing is repeated.

If the value of the counter p has reached at least "3", which is the value of n, the correction processing is ended.

The pixel value acquiring part 121 acquires the pixel values of the new pixels forming an image obtained by increasing the resolution of the first bitmap image, which is configured by the original pixels corrected by the above-described correction processing, to 1408×1408 pixels, as described above.

The image acquiring part 126 acquires a second bitmap image configured by new pixels having the pixel values acquired by the pixel value acquiring part 121, and the output unit 15 outputs the second bitmap image acquired by the image acquiring part 126. The output is, for example, displaying on a monitor.

Figure 6:
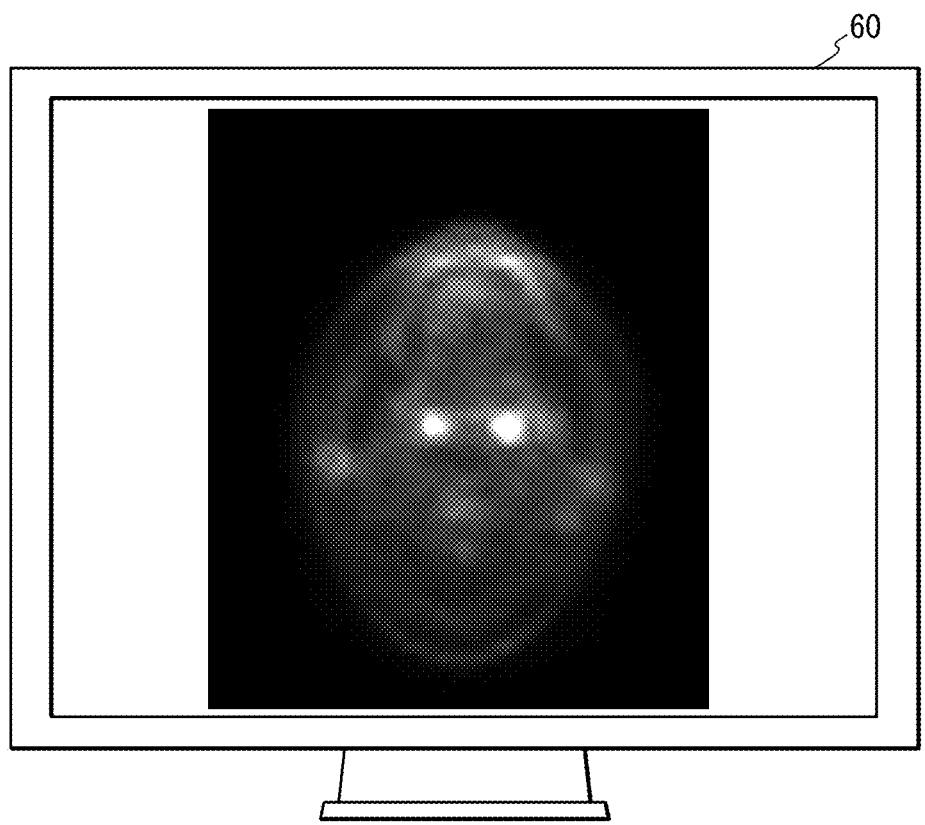
FIG. 6 is a view showing a display example of a second bitmap image of this example.

FIG. 6 is a view showing a display example of the second bitmap image on the monitor 60. In this example, it is assumed that the second bitmap image is displayed on the monitor 60 at the same display size as that of the first bitmap image shown in FIG. 3, and the second bitmap image is displayed at a display resolution higher than that of the screen of the monitor 60. That is to say, it is assumed that the second bitmap image is displayed as an image whose size has been reduced.

For example, with the processing for increasing the resolution following the commonly used bicubic method or the like, jaggies caused by increasing the resolution can be reduced or can be made inconspicuous, but, for example, if images before and after increasing the resolution are compared at the same size, there is no significant difference between the images. However, in this specific example, the processing for correcting the pixel value of the original pixel is repeated such that a difference between the corrected pixel value of the original pixel and an average value of the pixel values of the multiple new pixels positioned in the area in which the original pixel is disposed decreases. Accordingly, for example, as seen from the comparison between FIGS. 3 and 6, the first bitmap image is converted to an image having a high quality.

Hereinafter, the processing for acquiring the pixel value of the new pixel using all pixels positioned within a predesignated distance around the position at which the new pixel is disposed as described in (2) above, which is used in this specific example, will be described by way of a specific example.

Figure 7:
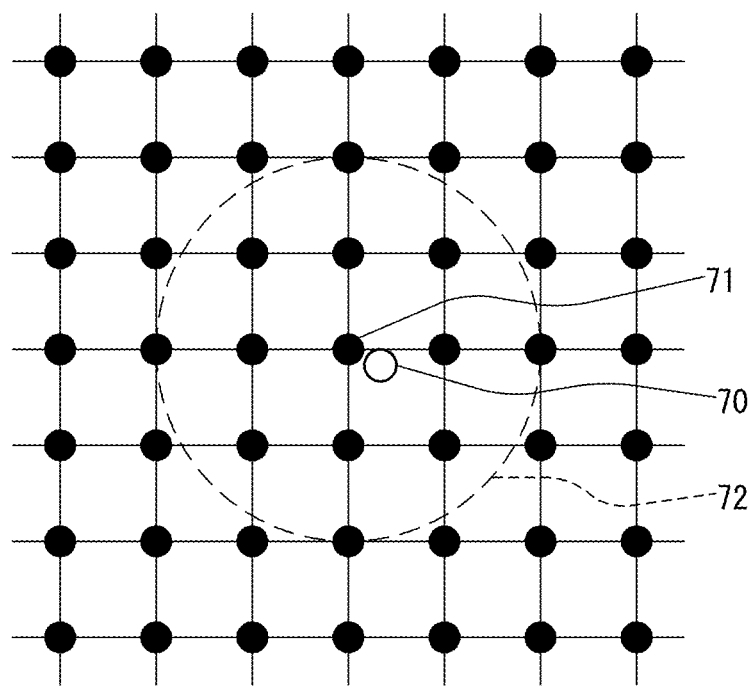
FIG. 7 is a schematic diagram showing an arrangement of original pixels of the first bitmap image of this example.

FIG. 7 is a schematic diagram showing an arrangement of the original pixels of the first bitmap image. In this case, the center of each original pixel is indicated by a black circle. Hereinafter, for example, a case will be described in which a pixel value of one new pixel disposed at a position 70 indicated by a white circle is acquired. For example, it is set in advance that original pixels within a distance for two pixels (distance for two sides of original pixels) centered about the original pixel that is nearest the position at which the new pixel is disposed are used as the original pixels within a predesignated distance around the position at which the new pixel is disposed. The pixel value acquiring part 121 acquires the pixel value of the new pixel, using the original pixels within the distance for two pixels centered about the position of an original pixel 71 that is nearest the position 70. Specifically, the pixel value of the new pixel disposed at the position 70 is acquired using the all original pixels within the range with a radius of two pixels centered about the position of the original pixel 71, indicated by a dotted line 72 in FIG. 7 (i.e., original pixels whose centers are positioned within the range indicated by the dotted line). In this case, 13 original pixels inside the dotted line 72 are used to acquire a new pixel.

Specifically, the pixel value of the new pixel is acquired using a following equation.

$$x_{NEW} = \frac{\sum_{k=1}^{m}(x_k \times a_k)}{\sum_{k=1}^{m}(a_k)} \quad (1)$$

In this equation, m is the number of original pixels positioned within a predesignated distance around the new pixel, $x_{NEW}$ is a pixel value of the new pixel, $x_k$ is a pixel value of a k-th original pixel positioned within a predesignated distance around the new pixel (within a distance for two pixels, in this case), and $a_k$ is a weighting value set in accordance with the distance between the k-th pixel and the new pixel. Note that the weighting value $a_k$ is a value that becomes smaller as the distance from the new pixel increases. For example, the weighting value $a_k$ is a value calculated using a decreasing function taking the distance as a variable.

Examples of functions for obtaining the weighting value include a following sync function.

$$f(t) = \frac{\sin \pi t}{\pi t} \quad (2)$$

In this equation, t is a value of the distance from the new pixel to each original pixel.

Furthermore, in the case of using the original pixels within a distance of "2" from the new pixel, a following equation obtained by approximating the above-mentioned function f(t) may be used.

$$f(t) = \begin{cases} (b+2)|t|^3 - (b+3)|t|^2 + 1 & \text{when } |t| \leq 1 \\ b|t|^3 - 5b|t|^2 + 8b|t| - 4b & \text{when } 1 < t \leq 2 \\ 0 & \text{when } 2 < |t| \end{cases} \quad (3)$$

In this equation, the value of b is preferably a value close to "−1", for example.

The pixel value acquiring part 121 repeats the correction processing using the pixel values of new pixels obtained by this processing, thereby finally acquiring a second bitmap image. For example, the first bitmap image in which the amount of sharply-edged portions contained therein is small as in a medical image can be made an image having a higher quality, by acquiring the pixel values of the new pixels using this processing.

Hereinafter, an example of a case will be described in which the designated distance from the new pixel, which is set to the distance for two pixels in the description above, is determined according to the identifying information of a section shown in the first bitmap image.

FIG. 8 is a table showing the distance management information stored in the distance management information storage unit 13. The distance management information has attributes "section ID" and "distance". In the table, "section ID" is section identifying information, and "distance" is a distance from a position at which a new pixel is disposed, where the unit in this case is the width of an original pixel as an example. In FIG. 8, each record (row) shows the distance management information. Note that the distance management information in this example is shown for the sake of convenience of the description, and may be different from distance management information that is optimal for an actual section and the like.

The pixel value acquiring part 121 reads the identifying information of a section associated with the first bitmap image as well when reading the first bitmap image from the image storage unit 11 to a memory or the like. For example, it is assumed that the read section identifying information is "head".

Before acquiring the pixel value of the new pixel, the pixel value acquiring part 121 detects a record with the value of "section ID" matching the section identifying information acquired from the image storage unit 11 (a record with the value of "section ID" being "head", in this case), from among the records of the distance management information shown in FIG. 8, and acquires the value of the distance of the detected record. In this case, "2" is acquired as the value of the distance.

Subsequently, the above-described processing is performed using the value "2" of the distance as the predesignated value of the distance. Accordingly, a second bitmap image having a higher quality can be acquired using a predesignated value of the distance that is optimal for the section shown in the first bitmap image.

Furthermore, in this specific example, an example was described in which it is judged whether or not to end the correction processing repeatedly performed by the image processing unit 12, based on the number of times of processing, but it is also possible to judge whether or not to end the correction processing, following the judgment processing shown in (B) or (C) above.

As described above, according to this example, original pixels of the first bitmap image can be corrected by repeating the correction processing once or more, and, thus, the resolution of the first bitmap image configured by the corrected original pixels can be increased. Accordingly, a second bitmap image having a high quality can be acquired in which the resolution is higher than that of the original first bitmap image and pixel blocks and the like present in the original first bitmap image are made more inconspicuous.

In the foregoing example, each process (each function) may be realized as an integrated process using a single apparatus (system), or may be realized as a distributed process using multiple apparatuses.

Furthermore, in the foregoing example, information relating to the processing performed by each constituent element, for example, information that is to be accepted, acquired, selected, produced, transmitted, or received by each constituent element, information such as a threshold value, a numerical expression, or an address used by each constituent element in the processing and the like may be retained in an unshown storage medium temporarily or for a long period of time even if not specified in the description above. Furthermore, information may be accumulated in the unshown storage medium by each constituent element or by an unshown accumulating unit. Furthermore, information may be read from the unshown storage medium by each constituent element or by an unshown reading unit.

Furthermore, in the foregoing example, the case was described in which the image processing apparatus is a stand-alone apparatus, but the image processing apparatus may be either a stand-alone apparatus or a server apparatus in a server-client system. In the latter case, the output unit and the accepting unit may use a communication line to accept input, or to output a screen.

Furthermore, in the foregoing example, constituent elements such as the image processing unit 12, the pixel value acquiring part 121, the representative value acquiring part 122, the correction value acquiring part 123, the pixel value correcting part 124, the condition judging part 125, and the image acquiring part 126 may be configured by dedicated hardware, or, alternatively, constituent elements that can be realized by software may be realized by executing a program. For example, each constituent element may be realized by a program execution unit such as a CPU reading and executing a software program stored in a storage medium such as a hard disk or a semiconductor memory. At the time of executing the program, the program execution unit may execute the program while accessing a storage unit (e.g., a storage medium such as a hard disk or a memory).

The software that realizes the image processing apparatus in the foregoing example may be the following sort of program. Specifically, this program is a program for causing a computer capable of accessing an image storage unit in which a first bitmap image is stored, to function as: an image processing unit that acquires a second bitmap image, which is a bitmap image obtained by increasing a resolution of the first bitmap image; and an output unit that outputs the second bitmap image acquired by the image processing unit; wherein the image processing unit is caused to function as: a pixel value acquiring part that acquires pixel values of multiple new pixels, which are pixels forming an image acquired by increasing the resolution of the first bitmap image, using pixel values of multiple original pixels around a position at which each of the new pixels is disposed, from among original pixels forming the first bitmap image; a representative value acquiring part that acquires a representative value of the pixel values of the multiple new pixels arranged in an area in which each of the original pixels of the first bitmap image is disposed, the pixel values being acquired by the pixel value acquiring part; a correction value acquiring part that acquires a correction value using the pixel value of each of the original pixels of the first bitmap image and the representative value acquired by the representative value acquiring part for an area in which that original pixel is disposed; a pixel value correcting part that corrects the pixel value of each of the original pixels of the first bitmap image, using the correction value acquired by the correction value acquiring part; and an image acquiring part that acquires a second bitmap image, which is a bitmap image configured by multiple new pixels having the pixel values acquired by the pixel value acquiring part; correction processing, which is processing in which the pixel value acquiring part acquires the pixel values of the multiple new pixels, the representative value acquiring part acquires the representative value of the pixel values of the multiple new pixels, the correction value acquiring part acquires the correction value, and the pixel value correcting part corrects the pixel value of each of the original pixels of the first bitmap image, is repeated once or at least twice, and the image acquiring part acquires a second bitmap image configured by multiple new pixels having the pixel values acquired by the pixel value acquiring part, using the pixel values of the multiple original pixels corrected by repeating the correction processing.

In the program, in a transmitting step of transmitting information, a receiving step of receiving information, or the like, processing performed by hardware, for example, processing performed by a modem or an interface card in the transmitting step (processing that can be performed only by such hardware) is not included.

In the program, the functions realized by the program do not include functions that can be realized only by hardware. For example, functions that can be realized only by hardware, such as a modem or an interface card, in an accepting unit that accepts information or an output unit that outputs information are not included in the functions realized by the above-described program.

Furthermore, a computer that executes the program may be a single computer or may be multiple computers. That is to say, integrated processing may be performed, or distributed processing may be performed.

Figure 9:
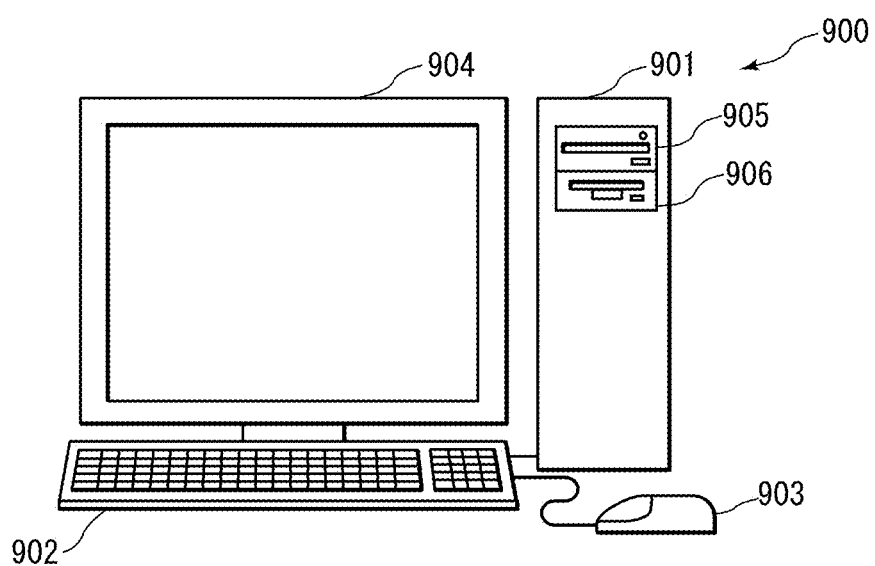
FIG. 9 is a view showing an exemplary appearance of a computer system according to this example.

FIG. 9 is a schematic view showing an exemplary appearance of a computer that executes the program described above to realize the image processing apparatus in the foregoing example. The foregoing example may be realized using computer hardware and computer programs executed thereon.

In FIG. 9, a computer system 900 is provided with a computer 901 including a compact disk read only memory (CD-ROM) drive 905 and a Floppy (registered trademark) disk (FD) drive 906, a keyboard 902, a mouse 903, and a monitor 904.

Figure 10:
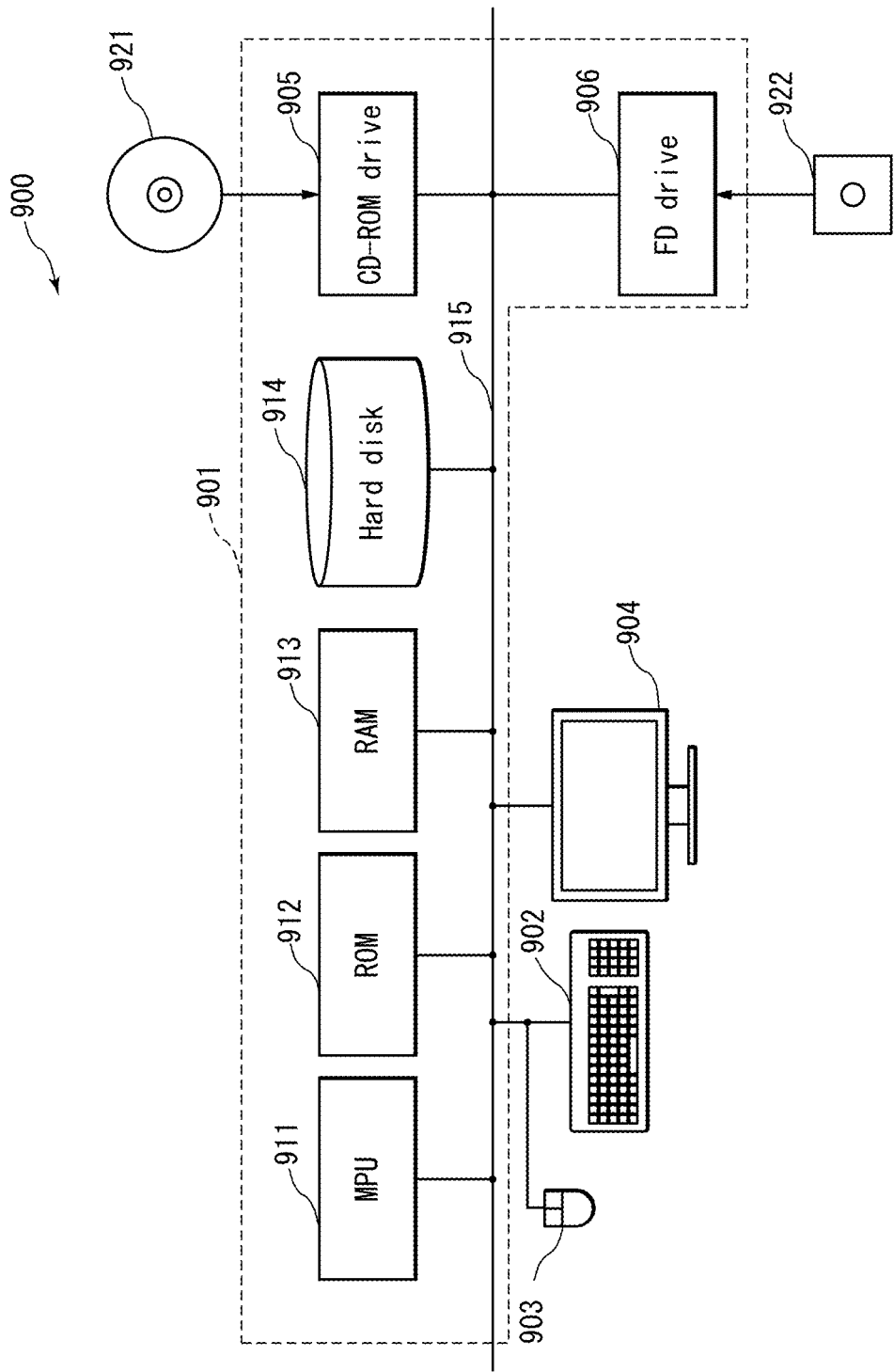
FIG. 10 is a diagram showing an example of the configuration in this example.

FIG. 10 is a diagram showing an internal configuration of the computer system 900. In FIG. 10, the computer 901 is provided with, in addition to the CD-ROM drive 905 and the FD drive 906, a micro processing unit (MPU) 911, a ROM 912 in which a program such as a boot up program is to be stored, a random access memory (RAM) 913 that is connected to the MPU 911 and in which a command of an application program is temporarily stored and a temporary storage area is to be provided, a hard disk 914 in which an application program, a system program, and data are stored, and a bus 915 that connects the MPU 911, the ROM 912, and the like. Note that the computer 901 may include an unshown network card for providing a connection to a LAN.

The program for causing the computer system 900 to execute the functions of the image processing apparatus and the like in the foregoing example may be stored in a CD-ROM 921 or an FD 922 that is inserted into the CD-ROM drive 905 or the FD drive 906, and be transmitted to the hard disk 914. Alternatively, the program may be transmitted via an unshown network to the computer 901 and stored in the hard disk 914. At the time of execution, the program is loaded into the RAM 913. The program may be loaded from the CD-ROM 921 or the FD 922, or directly from a network.

The program does not necessarily have to include, for example, an operating system (OS) or a third party program to cause the computer 901 to execute the functions of the image processing apparatus in the foregoing example. The program may only include a command portion to call an appropriate function (module) in a controlled mode and obtain desired results.

The manner in which the computer system 900 operates is well known, and, thus, a detailed description thereof has been omitted.

The present invention is not limited to the example set forth herein. Various modifications are possible within the scope of the invention.

As described above, the image processing apparatus and the like according to the present invention are suitable as an apparatus and the like for improving the quality of a bitmap image, and are particularly useful as an apparatus and the like for improving the quality of a bitmap image having a low resolution.

The invention claimed is:

1. An image processing apparatus, comprising one or more processors configured to implement:
an image storage unit in which a first image is stored;
an image processing unit that acquires a second image, which is an image obtained by increasing a resolution of the first image; and
an output unit that outputs the second image acquired by the image processing unit, wherein
the image processing unit includes:
a pixel value acquiring part that acquires pixel values of multiple new pixels, which are pixels forming an image acquired by increasing the resolution of the first image, using pixel values of multiple original pixels around a position at which each of the new pixels is disposed, from among original pixels forming the first image;
a representative value acquiring part that acquires a representative value of the pixel values of the multiple new pixels arranged in an area in which each of the original pixels of the first image is disposed, the pixel values being acquired by the pixel value acquiring part;
a correction value acquiring part that acquires a correction value using the pixel value of each of the original pixels of the first image and the representative value acquired by the representative value acquiring part for an area in which that original pixel is disposed;
a pixel value correcting part that corrects the pixel value of each of the original pixels of the first image, using the correction value acquired by the correction value acquiring part; and
an image acquiring part that acquires a second image, which is an image configured by multiple new pixels having the pixel values acquired by the pixel value acquiring part,
the image processing unit performs correction processing, which is processing in which the pixel value acquiring part acquires the pixel values of the multiple new pixels, the representative value acquiring part acquires the representative value of the pixel values of the multiple new pixels, the correction value acquiring part acquires the correction value, and the pixel value correcting part corrects the pixel value of each of the original pixels of the first image,
the image processing unit repeats the correction processing, and
the image acquiring part acquires a second image configured by multiple new pixels having the pixel values acquired by the pixel value acquiring part, using the pixel values of the multiple original pixels corrected by repeating the correction processing.

2. The image processing apparatus according to claim 1, wherein
the image processing unit further includes a condition judging part that judges whether or not a predesignated end condition is satisfied each time the correction processing is performed once, and
the image processing unit ends the correction processing in a case where the condition judging part judges that the end condition is satisfied.

3. The image processing apparatus according to claim 2, wherein the condition judging part compares the pixel value of each original pixel of the first image before the correction processing and the representative value of the pixel values of the multiple new pixels, of the second image, arranged in an area in which that original pixel is disposed, and judges that the end condition is satisfied in a case where a predesignated condition is satisfied by a result of the comparison.

4. The image processing apparatus according to claim 2, wherein, each time the image processing unit performs the correction processing once, the condition judging part compares the pixel value obtained by the pixel value correcting part correcting the pixel value of each original pixel of the first image and the pixel value of that original pixel before performing the correction processing once, and judges that the end condition is satisfied in a case where a predesignated condition is satisfied by a result of the comparison.

5. The image processing apparatus according to claim 2, wherein the condition judging part judges that the end condition is satisfied in a case where the number of repetitions of the correction processing performed by the image processing unit has reached at least n times (n is an integer of 1 or more), which is a predesignated number of times.

6. The image processing apparatus according to claim 1, wherein the pixel value acquiring part acquires the pixel value of each of the new pixels, using the pixel values of all original pixels within a predesignated distance around the position at which that new pixel is disposed.

7. The image processing apparatus according to claim 6, wherein
the first image is an image showing a state inside a living body,
the image processing apparatus further comprises a distance management information storage unit in which distance management information, which is information having identifying information of a section inside a living body and a distance corresponding to the identifying information of that section, is stored, and
the pixel value acquiring part acquires the distance corresponding to the identifying information of the section shown in the first image, from the distance management information, and uses the acquired distance as the predesignated distance.

8. The image processing apparatus according to claim 5, wherein
the first image is an image showing a state inside a living body,
the image processing apparatus further comprises a processing number management information storage unit in which processing number management information, which is information having identifying information of a section inside a living body and the number of times corresponding to the identifying information of that section, is stored, and
the condition judging part acquires the number of times corresponding to the identifying information of the section shown in the first image, from the processing number management information, and uses the acquired number of times as the value of n.

9. The image processing apparatus according to claim 1, wherein the correction value is a difference between the pixel value of each original pixel of the first image and the representative value of the pixel values of the multiple new pixels arranged in an area in which that original pixel is disposed.

10. The image processing apparatus according to claim 1, wherein the representative value is an average value of the pixel values of the multiple new pixels arranged in the area in which each of the original pixels is disposed.

11. The image processing apparatus according to claim 1, wherein the first image is an image showing a state inside a living body.

12. An image processing method, performed using: an image storage unit in which a first image is stored; an image processing unit including a pixel value acquiring part, a representative value acquiring part, a correction value acquiring part, a correction value acquiring part, a pixel value correcting part, and an image acquiring part; and an output unit; the method comprising:
    an image processing step of the image processing unit acquiring a second image, which is an image obtained by increasing a resolution of the first image; and
    an output step of the output unit outputting the second image acquired in the image processing step;
    wherein the image processing step includes:
        a pixel value acquiring step of the pixel value acquiring part acquiring pixel values of multiple new pixels, which are pixels forming an image acquired by increasing the resolution of the first image, using pixel values of multiple original pixels around a position at which each of the new pixels is disposed, from among original pixels forming the first image;
        a representative value acquiring step of the representative value acquiring part acquiring a representative value of the pixel values of the multiple new pixels arranged in an area in which each of the original pixels of the first image is disposed, the pixel values being acquired in the pixel value acquiring step;
        a correction value acquiring step of the correction value acquiring part acquiring a correction value using the pixel value of each of the original pixels of the first image and the representative value acquired in the representative value acquiring step for an area in which that original pixel is disposed;
        a pixel value correcting step of the pixel value correcting part correcting the pixel value of each of the original pixels of the first image, using the correction value acquired in the correction value acquiring step; and
        an image acquiring step of the image acquiring part acquiring a second image, which is an image configured by multiple new pixels having the pixel values acquired in the pixel value acquiring step;
    correction processing, which is processing in which the pixel values of the multiple new pixels are acquired in the pixel value acquiring step, the representative value of the pixel values of the multiple new pixels is acquired in the representative value acquiring step, the correction value is acquired in the correction value acquiring step, and the pixel value of each of the original pixels of the first image is corrected in the pixel value correcting step, is repeated, and
    in the image acquiring step, the image acquiring part acquires a second image configured by multiple new pixels having the pixel values acquired in the pixel value acquiring step, using the pixel values of the multiple original pixels corrected by repeating the correction processing.

13. A non-transitory computer readable storage medium in which a computer readable program is stored, the program being for causing a computer capable of accessing an image storage unit in which a first image is stored, to function as: an image processing unit that acquires a second image, which is an image obtained by increasing a resolution of the first image; and an output unit that outputs the second image acquired by the image processing unit, wherein
    the image processing unit is caused to function as:
        a pixel value acquiring part that acquires pixel values of multiple new pixels, which are pixels forming an image acquired by increasing the resolution of the first image, using pixel values of multiple original pixels around a position at which each of the new pixels is disposed, from among original pixels forming the first image;
        a representative value acquiring part that acquires a representative value of the pixel values of the multiple new pixels arranged in an area in which each of the original pixels of the first image is disposed, the pixel values being acquired by the pixel value acquiring part;
        a correction value acquiring part that acquires a correction value using the pixel value of each of the original pixels of the first image and the representative value acquired by the representative value acquiring part for an area in which that original pixel is disposed;
        a pixel value correcting part that corrects the pixel value of each of the original pixels of the first image, using the correction value acquired by the correction value acquiring part; and
        an image acquiring part that acquires a second image, which is an image configured by multiple new pixels having the pixel values acquired by the pixel value acquiring part,
    the image processing unit is caused to perform correction processing, which is processing in which the pixel value acquiring part acquires the pixel values of the multiple new pixels, the representative value acquiring part acquires the representative value of the pixel values of the multiple new pixels, the correction value acquiring part acquires the correction value, and the pixel value correcting part corrects the pixel value of each of the original pixels of the first image,
    the image processing unit is caused to repeat the correction processing, and
    the image acquiring part acquires a second image configured by multiple new pixels having the pixel values acquired by the pixel value acquiring part, using the pixel values of the multiple original pixels corrected by repeating the correction processing.

* * * * *